(12) United States Patent
Sasaki et al.

(10) Patent No.: US 9,568,126 B2
(45) Date of Patent: Feb. 14, 2017

(54) THREADED JOINT FOR STEEL PIPE

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Masayoshi Sasaki, Tokyo (JP); Katsutoshi Sumitani, Tokyo (JP); Kunio Goto, Tokyo (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 41 days.

(21) Appl. No.: 14/394,987

(22) PCT Filed: Jun. 4, 2013

(86) PCT No.: PCT/JP2013/065472
§ 371 (c)(1),
(2) Date: Oct. 16, 2014

(87) PCT Pub. No.: WO2013/183634
PCT Pub. Date: Dec. 12, 2013

(65) Prior Publication Data
US 2015/0130182 A1    May 14, 2015

(30) Foreign Application Priority Data
Jun. 7, 2012 (JP) .................................. 2012-130134

(51) Int. Cl.
*F16L 15/04* (2006.01)
*F16L 15/00* (2006.01)
(Continued)

(52) U.S. Cl.
CPC .............. *F16L 15/04* (2013.01); *C10M 107/50* (2013.01); *E21B 17/042* (2013.01); *F16L 15/001* (2013.01);
(Continued)

(58) Field of Classification Search
CPC ........ F16L 15/04; F16L 15/004; F16L 15/001; C10M 107/50; C10M 2209/084; C10M 2213/0623; E21B 17/042; C10N 2230/12; C10N 2270/02
See application file for complete search history.

(56) References Cited

U.S. PATENT DOCUMENTS 4,616,719 A    10/1986  Dismukes
5,732,743 A *  3/1998   Livesay .................. B29C 73/10
                                               138/99
(Continued)

FOREIGN PATENT DOCUMENTS

CN    101151486 A    3/2008
CN    101300442 A    11/2008
(Continued)

OTHER PUBLICATIONS

Machine translation for JP 2009-254939 retrieved from EPO on Feb. 16, 2016 (24 pages).*
(Continued)

*Primary Examiner* — Rodney Mintz
(74) *Attorney, Agent, or Firm* — Birch, Stewart, Kolasch & Birch, LLP

(57) ABSTRACT

A threaded joint for a steel pipe includes a pin and a box each of which is provided with a contact surface that includes an unthreaded metal contact portion having a seal portion and a threaded portion. This threaded joint includes an ultraviolet ray-curable resin coating film that is formed on the contact surface of at least one of the pin and the box; and an (Continued)

acrylic silicone resin coating film that is formed on at least a portion of a surface of the ultraviolet ray-curable resin coating film.

4 Claims, 4 Drawing Sheets

(51) Int. Cl.
*C10M 107/50* (2006.01)
*E21B 17/042* (2006.01)

(52) U.S. Cl.
CPC ....... *F16L 15/004* (2013.01); *C10M 2209/084* (2013.01); *C10M 2213/0623* (2013.01); *C10N 2230/12* (2013.01); *C10N 2270/02* (2013.01)

(56) References Cited

U.S. PATENT DOCUMENTS

| | | | | |
|---|---|---|---|---|
| 8,586,644 | B2* | 11/2013 | Nagareo | C08F 290/06 520/1 |
| 9,169,951 | B2* | 10/2015 | Goto | C10M 169/041 285/94 |
| 9,194,515 | B2* | 11/2015 | Oshima | E21B 17/08 285/94 |
| 9,321,982 | B2* | 4/2016 | Goto | C09D 5/08 285/333 |
| 2006/0228505 | A1* | 10/2006 | Goto | E21B 12/06 428/36.9 |
| 2006/0255591 | A1* | 11/2006 | Reynolds | F16L 15/004 285/333 |
| 2009/0220780 | A1 | 9/2009 | Bordet et al. | |
| 2010/0301600 | A1 | 12/2010 | Goto et al. | |
| 2011/0025052 | A1* | 2/2011 | Goto | E21B 12/06 285/333 |
| 2012/0112456 | A1 | 5/2012 | Nagareo et al. | |
| 2013/0276294 | A1* | 10/2013 | Goto | C10M 169/041 29/525.11 |
| 2013/0277961 | A1* | 10/2013 | Goto | C10M 169/041 285/94 |
| 2013/0333790 | A1* | 12/2013 | Pinel | C08G 18/10 138/145 |
| 2014/0284919 | A1* | 9/2014 | Goto | F16L 15/04 285/94 |
| 2014/0352837 | A1* | 12/2014 | Yamamoto | F16L 57/005 138/96 T |
| 2015/0001841 | A1* | 1/2015 | Oshima | E21B 17/08 285/94 |
| 2015/0192229 | A1* | 7/2015 | Goto | E21B 17/042 285/94 |
| 2016/0002476 | A1* | 1/2016 | Breziat | C09D 5/008 428/35.8 |
| 2016/0208194 | A1* | 7/2016 | Matsumoto | F16L 57/06 |
| 2016/0230119 | A1* | 8/2016 | Goto | C09D 7/1233 |

FOREIGN PATENT DOCUMENTS

| | | | | |
|---|---|---|---|---|
| CN | 102459376 | A | 5/2012 | |
| JP | 2008-537062 | A | 9/2008 | |
| JP | 2009-531603 | A | 9/2009 | |
| JP | 2009-254939 | A | 11/2009 | |
| JP | 2010-330 | A | 1/2010 | |
| JP | WO 2010140703 | A1 * | 12/2010 | ............ C08F 290/06 |
| JP | 2011-12251 | A | 1/2011 | |
| JP | WO 2012060474 | A1 * | 5/2012 | ........ C10M 169/041 |
| JP | 2013-545940 | A | 12/2013 | |
| JP | 2014-501885 | A | 1/2014 | |
| UA | 40132 | U | 3/2009 | |
| UA | 96872 | C2 | 12/2011 | |
| WO | WO 2006/104251 | A1 | 10/2006 | |
| WO | WO 2007/042231 | A2 | 4/2007 | |
| WO | WO 2007/114460 | A1 | 10/2007 | |
| WO | WO 2009/072486 | A1 | 6/2009 | |
| WO | WO 2012/060472 | A1 | 5/2012 | |
| WO | WO 2012/060474 | A1 | 5/2012 | |

OTHER PUBLICATIONS

Extended European Search report for related Application No. 13800755.4 dated May 3, 2016 (6 pages).*
Chinese Office Action and Search Report, dated Jun. 30, 2015, for Chinese Application No. 201380028808.4, with English translation.
Japanese Notice of Allowance for counterpart Application No. 2014-520006 dated Nov. 4, 2015.
International Search Report, mailed Aug. 27, 2013, issued in PCT/JP2013/065472.
Written Opinion of the International Searching Authority, mailed Aug. 27, 2013, issued in PCT/JP2013/065472.
Ukrainian Notice of Allowance dated Jun. 2, 2016, for Ukrainian Application No. a201411303 with the English translation.
Egyptian Office Action for Egyptian Application No. 1954/2014 dated Sep. 29, 2016, with English language translation.

* cited by examiner

THREADED JOINT FOR STEEL PIPE

TECHNICAL FIELD

The present invention relates to a threaded joint for a steel pipe having superior lubricating performance and rust prevention performance. The threaded joint for a steel pipe according to the present invention exhibits sufficient rust prevention performance even in a tough storage environment, has sufficient lubricating performance for connecting oil country tubular goods (OCTG), and can also be used for simple repair. Therefore, this threaded joint is particularly suitable for use in connecting OCTG.

Priority is claimed on Japanese Patent Application No. 2012-130134, filed on Jun. 7, 2012, the content of which is incorporated herein by reference.

BACKGROUND ART

Oil country tubular goods (for example, a tubing through which a fluid such as crude oil flows; and a casing which surrounds a tubing), which are used in oil drilling for mining crude oil or gas oil, are generally several tens of meters long and are connected using threaded joints until they have a length to reach an oil well. In the past, the depth of an oil well was 2,000 m to 3,000 m (2,187 yards to 3,280 yards). However, in recent deep oil wells such as undersea oil wells, there are cases where the depth of an oil well reaches a range of 8,000 m to 10,000 m (8,748 yards to 10,936 yards) or deeper.

Depending on the usage environment thereof, a threaded joint for a steel pipe used for connecting oil country tubular goods is affected by a load such as an axial tension force caused by the weight of oil country tubular goods and a threaded joint; a complex pressure such as an internal or external surface pressure; and heat in the ground. Therefore, the threaded joint is required to maintain the airtightness of oil country tubular goods without being damaged even in such a tough environment.

FIG. 1 is a diagram schematically illustrating an assembly state of oil country tubular goods A and a coupling B which is a threaded joint component. In the oil country tubular goods A, a pin 1 having male threads 11 (refer to FIG. 2) is formed on external surfaces of both ends thereof. In the coupling B, a box 2 having female threads 21 (refer to FIG. 2) is formed on internal surfaces of both ends thereof. An end of the oil country tubular goods A is connected to an end of the coupling B in advance.

FIG. 2 is a diagram schematically illustrating the details of a pin-box structure of a typical threaded joint (also referred to as a special threaded joint) used for connecting the oil country tubular goods A. The pin 1 is a joint component having the male threads 11 and is typically formed on an end portion of the oil country tubular goods A. The box 2 is a joint component having the female threads 21 and is typically formed on an internal surface of the threaded joint component (coupling B). The pin 1 further includes, in addition to the male threads 11, a seal portion 13 and a shoulder portion 14 which are positioned closer to a tip end side of a steel pipe than the threaded portion. Correspondingly, the box 2 further includes, in addition to the female threads 21, a seal portion 23 which is positioned inside of the joint portion; and a shoulder portion 24 which comes into contact with the shoulder portion 14 of the pin 1. The seal portions 13 and 23 and the shoulder portions 14 and 24 of the pin 1 and the box 2 are an unthreaded metal contact portion of the threaded joint for a steel pipe. Reference numeral 12 represents a lip portion at a tip end of the pin 1 and reference numeral 31 represents a portion where the pin 1 is not in contact with the box 2 (a portion in which bleeding oil remains during connecting).

An end of the oil country tubular goods A is inserted into the coupling B, and the male threads 11 and the female threads 21 are connected to each other. As a result, the seal portion 13 of the pin 1 and the seal portion 23 of the box 2 come into contact with each other at an appropriate interference amount to form a metal seal. This metal seal secures the airtightness of the oil country tubular goods A connected to the coupling B. In this kind of threaded joint, in particular, in the seal portions 13 and 23, non-repairable seizure called galling may occur.

When the tubing and casing are lowered to an oil well, there are cases where a threaded joint connected thereto is disconnected due to various kinds of problems; they are pulled up from the oil well; and then they are connected and lowered again. American Petroleum Institute (API) requires galling resistance and airtightness in the sense that galling does not occur and the airtightness of oil country tubular goods is secured even when makeup (connecting) and breakout (disconnecting) are performed 10 times in the case of a tubing joint or 3 times in the case of a casing joint.

In order to improve airtightness and galling resistance during connecting, in the related art, a viscous liquid lubricant (referred to as "compound grease") containing heavy metal powder is coated onto a contact surface (the threaded portion and unthreaded metal contact portion) of the threaded joint. In API standard BUL5A2, such a compound grease is specified. The compound grease also exhibits rust prevention performance of preventing rust on the coated contact surface.

However, since the compound grease contains a large amount of powder of heavy metals such as zinc, lead, and copper, the coated grease may be washed and overflow on an external surface during the connecting of the threaded joint. As a result, there is a possibility that, in particular, harmful heavy metals such as lead may have an adverse effect on the environment (in particular, marine organisms). In addition, since the work environment deteriorates due to the coating operation of the compound grease, there is a concern of an adverse effect on a human body by the coating operation. Therefore, a threaded joint for a steel pipe capable of exhibiting superior galling resistance without using the compound grease is required.

As a threaded joint which can be used for connecting oil country tubular goods without coating the compound grease, many threaded joints for a steel pipe have been proposed until now in which a contact surface thereof is coated with a solid lubricant coating film composed of an organic or inorganic resin containing lubricating powder such as molybdenum disulfide or graphite.

As described above, in a threaded joint for a steel pipe having a seal portion, since galling is likely to occur particularly in the seal portion, it is necessary that rusting of the seal portion be prevented. This is because galling is likely to occur when the rust occurs. In addition, changes in the shape of the seal portion by corrosion causes deterioration in airtightness. In a threaded joint for a steel pipe which is not coated with the compound grease, since the rust prevention performance by the compound grease is not exhibited, the rust prevention of the seal portion is further important. However, the above-described solid lubricating coating film does not have sufficient rust prevention performance for preventing a cut portion of a joint including a seal portion from being rusted when being stored in a highly corrosive environment for a long period of time.

Patent Document 1 discloses a threaded joint for a steel pipe having superior rust prevention performance that includes an ultraviolet ray-curable resin coating film formed of a photocurable composition, which is curable by the irradiation of ultraviolet rays, on a contact surface of the threaded joint.

PRIOR ART DOCUMENT

Patent Document

[Patent Document 1] Japanese Unexamined Patent Application, First Publication No. 2011-12251

DISCLOSURE OF INVENTION

Problem that the Invention is to Solve

The threaded joint for a steel pipe disclosed in Japanese Unexamined Patent Application, First Publication No. 2011-12251 is effective for preventing rust on a contact surface (threaded portions and unthreaded metal contact portions of a pin and a box) of the threaded joint for a steel pipe, but there are cases where rust prevention performance is not always sufficient and rust cannot be completely prevented when the storage state is not appropriate or when the storage environment is tough. For example, oil country tubular goods may be stored in a tough environment such as a coast or a desert. Therefore, even when the storage environment is poor, rust prevention is required.

In addition, when the cleanliness of a coating surface is insufficient during the coating of an ultraviolet ray-curable resin composition, there are cases where coating defects are generated on a formed ultraviolet ray-curable coating film and rust prevention performance is locally insufficient. For example, when point-like rust is generated in a seal portion, the galling resistance and airtightness of a threaded joint significantly deteriorates. Therefore, it is necessary that a seal portion, in particular, be completely coated such that coating defects are not generated thereon.

Furthermore, in a coating film formed of an ultraviolet ray-curable resin composition, there are cases where necessary lubricating performance is not sufficiently obtained. In addition, even when defects are observed in the coating film, there is a problem in that defects are not easily repaired.

The present invention has been made in consideration of the above-described circumstances, and an object thereof is to provide a threaded joint for a steel pipe including an ultraviolet ray-curable resin coating film in which, even in a tough storage environment, sufficient rust prevention performance for preventing the rusting of a threaded joint for a steel pipe, used for connecting oil country tubular goods, is obtained; sufficient lubricating performance is obtained as a threaded joint for a steel pipe used for connecting oil country tubular goods; and even when coating defects are generated during coating, the defects can be easily repaired.

Means for Solving the Problems

The present invention adopts the following means in order to solve the above-described problems and achieve the object.

(1) According to an aspect of the present invention, there is provided a threaded joint for a steel pipe including a pin and a box each of which is provided with a contact surface that includes: an unthreaded metal contact portion having a seal portion; and a threaded portion, the threaded joint including: an ultraviolet ray-curable resin coating film that is formed on the contact surface of at least one of the pin and the box; and an acrylic silicone resin coating film that is formed on at least a portion of a surface of the ultraviolet ray-curable resin coating film.

(2) In the threaded joint for a steel pipe according to (1), the acrylic silicone resin coating film may be formed on a portion which covers at least the seal portion on the surface of the ultraviolet ray-curable resin coating film.

(3) In the threaded joint for a steel pipe according to (1) or (2), the acrylic silicone resin coating film may be formed on the entire surface of the ultraviolet ray-curable resin coating film.

(4) In the threaded joint for a steel pipe according to any one of (1) to (3), the ultraviolet ray-curable resin coating film may contain a colorant.

Advantageous Effects of the Invention

According to the above-described aspect, at least a portion of the contact portions of the threaded joint for a steel pipe, preferably, a portion including the seal portion where galling is particularly likely to occur and which is important in terms of the airtightness of the threaded joint is coated with the coating film having a two-layer structure of the ultraviolet ray-curable resin coating film and the acrylic silicone resin coating film as an upper layer formed thereon. As a result, it is possible to provide a threaded joint for a steel pipe capable of preventing the rusting of the threaded joint for a steel pipe even when being stored in a tough environment; and exhibiting sufficient lubricating performance for connecting oil country tubular goods.

In addition, even if the cleanliness of the contact surface is insufficient and coating defects are generated on the ultraviolet ray-curable resin coating film, the defects can be repaired with the acrylic silicone resin coating film according to the above-described aspect. Therefore, rust prevention performance can be reliably obtained.

BEST MODE FOR CARRYING OUT THE INVENTION

Figure 1:
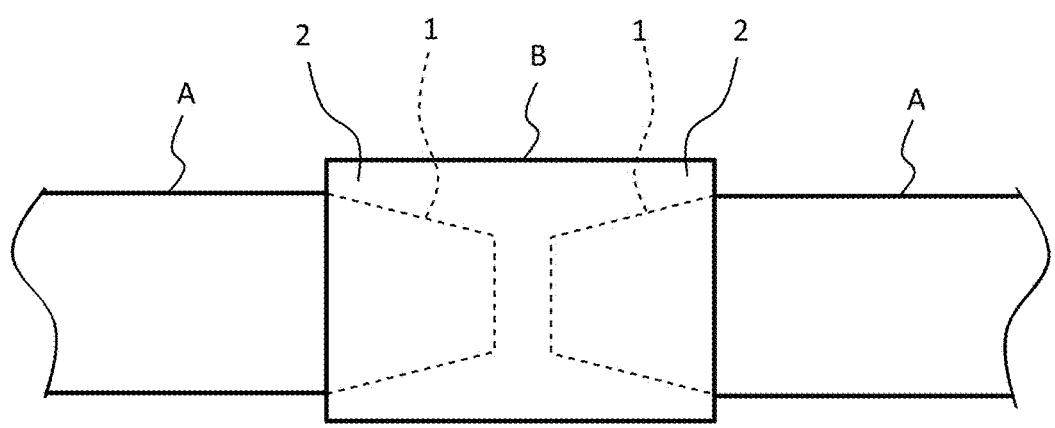
FIG. 1 is a diagram schematically illustrating an assembly state of oil country tubular pipes and a coupling which is a threaded joint component.
Figure 2:
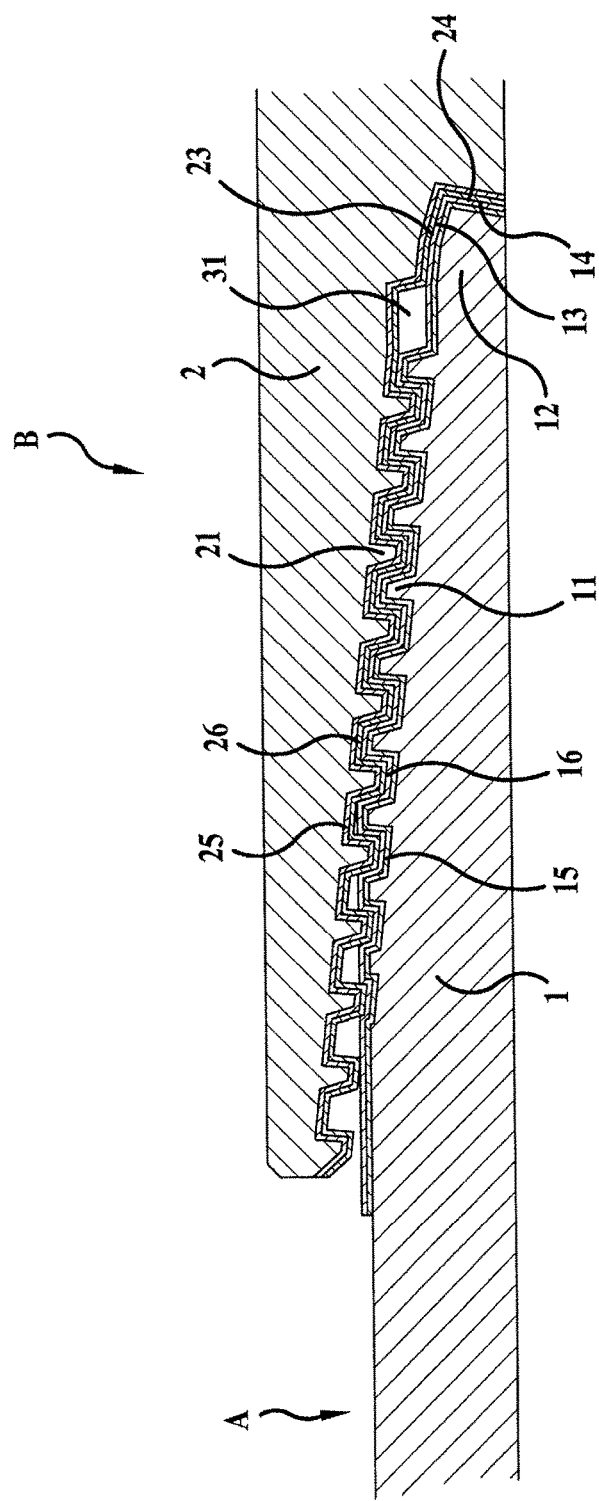
FIG. 2 is a diagram schematically illustrating a connecting portion of a threaded joint for a steel pipe.

Hereinbelow, an embodiment of the present invention will be described. Since the basic configuration of a threaded joint for a steel pipe according to the embodiment are the same as that illustrated in FIGS. 1 and 2, the description will be made referring to FIGS. 1 and 2 for convenience of description.

The threaded joint for a steel pipe according to the embodiment includes a pin 1 and a box 2 each of which is provided with a contact surface that has a threaded portion; and an unthreaded metal contact portion having a seal portion and a shoulder portion. That is, referring to FIGS. 1 and 2, the pin 1 includes male threads 11 as the threaded portion and includes a seal portion 13 and a shoulder portion 14 as the unthreaded metal contact portion. In addition, the box 2 includes female threads 21 as the threaded portion and includes a seal portion 23 and a shoulder portion 24 as the unthreaded metal contact portion.

The threaded joint for a steel pipe according to the embodiment includes an ultraviolet ray-curable resin coating film 15 and 25 that is formed on the contact surface (preferably on the entire contact surface) of at least one (that is, only the pin 1, only the box 2, or both the pin 1 and the box 2) of the pin 1 and the box 2; and an acrylic silicone resin coating film 16 and 26 that is formed on at least a portion of a surface of the ultraviolet ray-curable resin coating film, preferably on a portion which covers the seal portions 13 and 23.

Ultraviolet Ray-Curable Resin Coating Film

The ultraviolet ray-curable resin coating film can be formed using an appropriate ultraviolet ray-curable resin coating material which is applicable to a steel material. Generally, the ultraviolet ray-curable resin coating material contains at least a monomer, an oligomer, and a photopolymerization initiator and may further contain various kinds of additives such as a pigment, a rust preventing agent, a defoaming agent, and a leveling agent. An example of such an ultraviolet ray-curable resin coating material is disclosed in Japanese Unexamined Patent Application, First Publication No. 2011-12251 as a photocurable composition. However, the ultraviolet ray-curable resin coating material is not limited thereto. In addition, commercially available ultraviolet ray-curable resin coating materials may be used.

As the ultraviolet ray-curable resin coating material, a material is preferable in which the rust prevention property of a coating film is superior; the curing rate is high; and a thick film can be obtained. In addition, in consideration of a coating environment, it is preferable that a solventless ultraviolet ray-curable resin coating material be used. In order to enhance the lubricating property of a formed ultraviolet ray-curable resin coating film, at least one lubricant selected from waxes, metallic soaps, PTFE resin, and fibrous fillers may be added to the coating material in an amount of, for example, not more than 30% by mass in terms of solid content. As the rust preventing agent for enhancing the rust prevention performance of the ultraviolet ray-curable resin coating film, for example, aluminum tripolyphosphate or aluminum phosphite can be used. In this case, the amount thereof added is preferably less than or equal to 10% by mass in terms of solid content. As the pigment for coloring the coating film, a material which does not significantly impair the transparency of the coating film can be used. Examples of such a pigment include fluorescent pigments and light color pigments.

As the ultraviolet ray-curable coating material, it is particularly preferable that an epoxy acrylic resin having superior rust prevention performance be used. This kind of ultraviolet ray-curable coating material contains acrylic acid (or methacrylic acid)-modified epoxy resin, obtained by adding acrylic acid (or methacrylic acid) to epoxy resin as the oligomer. In this case, an ultraviolet ray-curable resin coating material (for example, an urethane acrylic resin) other than the above-described coating material can be used. Examples of commercially available ultraviolet ray-curable resin coating materials include an epoxy acrylic resin coating material which is manufactured by Chugoku Marine Paints Ltd. and has a trade name of Aulrex.

The ultraviolet ray-curable resin coating film can be formed by coating the contact surface (preferably, the entire contact surface) of at least one of the pin 1 and the box 2 of the threaded joint for a steel pipe with the ultraviolet ray-curable resin coating material using an appropriate method; and irradiating the coated contact surface with ultraviolet rays. As a coating method of the ultraviolet ray-curable coating material, it is preferable that spray coating be used. However, other coating methods such as brush coating or dip coating may be used. The irradiation of ultraviolet rays may be performed using an appropriate radiation source corresponding to the photopolymerization initiator to be used in the coating material.

The thickness of the ultraviolet ray-curable resin coating film can be adjusted within a range of 1 μm to 100 μm (0.00004 inches to 0.004 inches), preferably, within a range of 5 μm to 30 μm (0.0002 inches to 0.001 inches). Generally, since the ultraviolet ray-curable resin coating film has superior adhesion with a substrate (the contact surface of the threaded joint for a steel pipe) and is an impermeable coating film having high transparency, rust prevention performance is superior.

Acrylic Silicone Resin Coating Film

The acrylic silicone resin coating film is formed on at least a portion of a surface of the ultraviolet ray-curable resin coating film. That is, in the threaded joint for a steel pipe according to the embodiment, a coating film having the two-layer structure of the ultraviolet ray-curable resin coating film as the lower layer and the acrylic silicone resin coating film as the upper layer is formed on at least a portion of the contact portion of at least one of the pin 1 and the box 2. By providing the acrylic silicone resin coating film on the ultraviolet ray-curable resin coating film, not only the above-described repairing effect but also the lubricating performance of the threaded joint for a steel pipe can be improved. As a result, galling is difficult to occur.

When the acrylic silicone resin coating film is formed on only a portion of the surface of the ultraviolet ray-curable resin coating film, it is preferable that the acrylic silicone resin coating film be formed on a portion which covers the seal portion, in which galling is most likely to occur, on the surface of the ultraviolet ray-curable resin coating film. For example, a configuration may be adopted in which the threaded portions are coated with only the ultraviolet ray-curable resin coating film; and the seal portions and the shoulder portions (that is, the unthreaded metal contact portions) are coated with the coating film having the two-layer structure of the ultraviolet ray-curable resin coating film as the lower layer and the acrylic silicone resin coating film as the upper layer. Since the ultraviolet ray-curable resin coating film and the acrylic silicone resin coating film with which the threaded portions and the seal portions are coated have superior transparency, the states of the threaded portions and the seal portions can be observed above the coating film. In particular, the pin 1 is easily damaged because the threaded portion (male threads 11) and the seal portion 13 are formed on the external surface. Therefore, it is desired that the damage state of the threaded portion be checked in advance for each connecting. According to the embodiment, even when both the ultraviolet ray-curable resin coating film and the acrylic silicone resin coating film are coated, the damage state of the threaded joint can be verified, for example, by visual inspection as in the case where no coating film is provided.

In this case, the acrylic silicone resin coating film as the upper layer can be formed on a portion of a contact surface not having the seal portion, for example, for the purpose of repair. Specific examples of such a case include a case where a pinhole, a non-uniformly coated portion, or the like is generated on the ultraviolet ray-curable resin coating film as the lower layer; and a case where the ultraviolet ray-curable resin coating film is partially damaged for some reasons. In such cases, there is a concern of deterioration of the rust prevention property such as the rusting of damaged portions. However, by forming the acrylic silicone resin coating film on the portions, the damage is repaired and the deterioration of the rust prevention property can be prevented. When the ultraviolet ray-curable resin coating film is damaged, it is preferable that the acrylic silicone resin coating film be formed such that the vicinity of damaged portions is also coated. When the ultraviolet ray-curable resin coating film is colored with a colorant such as a fluorescent pigment, damaged portions and non-uniformly coated portions of the coating film can be checked by visual inspection or the irradiation of ultraviolet rays.

In consideration of the rust prevention property and the lubricating property, it is preferable that the acrylic silicone resin coating film as the upper layer be formed on the entire surface of the ultraviolet ray-curable resin coating film. When the ultraviolet ray-curable resin coating film as the lower layer and the acrylic silicone resin coating film as the upper layer are formed on the entire contact surface, as described below in Examples, the torque on shoulder resistance is increased and the connecting torque specified by the threaded joint for a steel pipe can be adjusted to a high value. As a result, the additional effect of increasing the sealing property (airtightness) of the threaded joint for a steel pipe can be obtained.

An acrylic silicone resin coating material includes a reaction product of silicone resin and acrylic resin as the coating film-forming component. This coating material can form a dense resin coating film having a siloxane bond as the skeleton and has a strong adhesion force with an undercoat layer. The formed coating film can have high performance in adhesion, gloss maintainability, color maintainability, water resistance, chemical resistance (acid resistance and alkali resistance), oil resistance, contamination resistance, and long-term weather resistance, in addition to water repellency by the silicone component. The acrylic silicone resin coating material includes an oil type (solvent type; strong solvent type and weak solvent type) and an aqueous type (reaction curing type emulsion coating material). Both types can be used, but an oil type material is preferable because a coating film can be obtained by drying at a relatively low temperature within a short period of time. In particular, it is preferable that a normal temperature curing-type material be used. Since the temperature curing-type acrylic silicone resin material has a superior quick-drying property, heating is not required, a coating film can be rapidly formed, and the continuous operation can be performed. Therefore, there are no adverse effects on the productivity of the threaded joint for a steel pipe.

The present inventors have thoroughly investigated various kinds of materials of the resin coating film which is formed as the upper layer formed on the ultraviolet ray-curable resin coating film; and as a result, have found that, when the acrylic silicone resin coating film is formed as the upper layer, the rust prevention property is particularly improved and superior rust prevention performance is exhibited in a corrosive environment under salt spray conditions, as compared to an acrylic resin coating material or a fluororesin coating material which is generally known to have superior corrosion resistance.

As the acrylic silicone resin coating material, commercially available products can be used. Examples of commercially available acrylic silicone resin coating materials include an acrylic silicone resin material which is adopted as an oil silicone lacquer spray manufactured by Kanpe Hapio Co., Ltd.

The acrylic silicone resin coating material is coated onto the contact surface of the threaded joint for a steel pipe, on which the ultraviolet ray-curable resin coating film is formed, using the same appropriate method as that of the description of the ultraviolet ray-curable resin coating material followed by volatilizing the solvent to cure a coating film. As a result, a cured coating film can be formed.

It is preferable that the thickness of the acrylic silicone resin coating film be in a range of 1 μm to 100 μm (0.00004 inches to 0.004 inches). When the thickness of the acrylic silicone resin coating film is less than 1 μm (0.00004 inches), the rust prevention property significantly deteriorates. When the thickness of the acrylic silicone resin coating film is greater than 100 μm (0.004 inches), the lubricating property significantly deteriorates. In the viewpoint of coexistence with the rust prevention property and the lubricating property, it is more preferable that the thickness of the acrylic silicone resin coating film be in a range of 5 μm to 10 μm (0.0002 inches to 0.0004 inches).

When the thickness of the acrylic silicone resin coating film is in a range of 5 μm to 10 μm (0.0002 inches to 0.0004 inches), an improvement of a constant rust prevention performance can be confirmed. However, when the thickness of the acrylic silicone resin coating film is greater than 10 μm (0.0004 inches), an improvement of a further rust prevention performance cannot be confirmed. On the other hand, when the thickness of the acrylic silicone resin coating film becomes greater, the galling resistance is inhibited. As a result, the allowance frequency of the repetition with connection and disconnection decreases.

The ultraviolet ray-curable resin coating film is obtained through a curing process in which a coating material containing a monomer, an oligomer, a photopolymerization initiator, and the like are irradiated with ultraviolet rays to produce radicals from the photopolymerization initiator; the monomer is converted into a polymer by these radicals; and the coating material is cured. On the other hand, the acrylic silicone resin coating film is obtained through a curing process in which in a coating material (for example, oil silicone lacquer spray) containing acrylic silicone resin, a volatile solvent, a curing agent, and the like, the solvent volatilizes; and the coating material is cured.

That is, the curing processes of the ultraviolet ray-curable resin coating film and the acrylic silicone resin coating film are basically totally different from each other.

Undercoat Treatment

The threaded portions and the unthreaded metal contact portions, which are the contact surface of the threaded joint for a steel pipe on which the ultraviolet ray-curable resin coating film is formed, are formed through a cutting process including thread cutting, and the surface roughness thereof is generally about 3 μm to 5 μm (0.0001 inches to 0.0002 inches). When the surface roughness of the contact surface is greater than the above-described range, the adhesion of a coating film formed thereon can be increased. As a result, the performance of the threaded joint such as the connecting property and rust prevention property can be improved. To that end, before the formation of the ultraviolet ray-curable resin coating film, an undercoat treatment capable of increasing the surface roughness may be performed on the contact surface of the threaded joint for a steel pipe.

Examples of such an undercoat treatment include a blast treatment of blasting an abrasive such as a spherical shot material or a horn-shaped grid material; and an acid washing treatment of dipping the contact surface in a strong acid solution such as sulfuric acid, hydrochloric acid, nitric acid, or hydrofluoric acid to roughen the surface. These treatments can increase the surface roughness of a base material itself.

Other examples of the undercoat treatment include chemical conversion coating such as a phosphating treatment, an oxalating treatment, or a borating treatment; and metal plating.

In the chemical conversion treatment, a conversion coating film formed of needle crystal and having a large surface roughness is formed. As a result, the surface roughness is increased and the adhesion of a solid rust prevention film and a solid lubricating coating film formed thereon can be increased. In order to further improve the rust prevention property, it is preferable that an undercoat layer (lower layer formed below the ultraviolet ray-curable resin coating film) be formed of zinc phosphate, manganese phosphate, or the like.

Metal plating can improve the galling resistance of the threaded joint for a steel pipe, and partial metal plating can increase the surface roughness. Examples of metal plating for increasing the surface roughness include plating of copper, iron, and an alloy thereof using an electroplating method; impact plating of zinc or a zinc alloy in which particles, obtained by coating iron cores with zinc, an zinc-iron alloy, or the like, are blown by a centrifugal force or an air pressure, zinc particles or zinc-iron alloy particles are deposited, and a porous metal coating film is formed; and composite metal plating of dispersing solid fine particles in a metal to form a coating film. In particular, the impact plating is effective for increasing the surface roughness.

No matter which method is used in the undercoat treatment of the contact surface, it is preferable that the surface roughness Rz be adjusted to 5 µm to 40 µm (0.0002 inches to 0.002 inches) after the surface roughening of the undercoat treatment. When the surface roughness Rz is less than 5 µm (0.0002 inches), there are cases in which the adhesion with a coating film formed on the contact surface is insufficient. On the other hand, when the surface roughness Rz is greater than 40 µm (0.002 inches), the friction of the surface increases and there are cases where, when a high surface pressure is applied thereto, a coating film formed on the contact surface cannot endure a shearing force and a compression force and is broken or peeled off. As the undercoat treatment for surface roughening, two or more kinds of treatments may be used in combination.

Other Coating Films

When the ultraviolet ray-curable resin coating film as the lower layer and the acrylic silicone resin coating film as the upper layer are formed on the contact surface of at least one (for example, the pin 1) of the pin 1 and the box 2 of the threaded joint for a steel pipe, the treatment on the contact surface of the other one (for example, the box 2) is not particularly limited. For example, only the ultraviolet ray-curable resin coating film as the lower layer may be formed. Alternatively, various kinds of surface treatments of a threaded joint for a steel pipe, which have been disclosed and will be disclosed in the related art, may be applied thereto.

The coating film having a two layer structure according to the present invention of the ultraviolet ray-curable resin coating film as the lower layer and the acrylic silicone resin coating film as the upper layer has a superior rust prevention property. However, when this coating film having the two-layer structure is formed on the contact surfaces of both the pin 1 and the box 2, there are cases where galling resistance is insufficient for the connecting of the threaded joint for a steel pipe. In this case, it is preferable that the coating film having the two-layer structure according to the present invention be formed on the contact surface of at least one of the pin 1 and the box 2; and a solid lubricating coating film described below be formed on the contact surface of the other one.

Examples of the solid lubricating coating film include a coating film which contains lubricating powder and optionally other components in an organic or inorganic resin. Examples of the lubricating powder include molybdenum disulfide, tungsten disulfide, graphite, and polytetrafluoroethylene. Examples of the resin which is a binder include organic resins such as epoxy resin, polyamide resin, and polyamideimide resin; and silicon or titanium compounds (for example, alkyl silicate, silica sol, and titania sol) which can form an silica or titania inorganic resin coating film. The solid lubricating coating film may be a thin lubricating film having no stickiness disclosed in WO 2007/042231 in which solid lubricant particles having plastic or viscoplastic rheological behavior (flow characteristic) are dispersed in a solid matrix. This lubricating coating film can be formed by coating, using a hot melt method, a composition which contains, for example, polyethylene as a thermoplastic polymer; wax (for example, carnauba wax) and metallic soap (for example, zinc stearate) as lubricating components; and calcium sulfonate as a corrosion inhibitor. Wax, metallic soap, calcium sulfonate, and the like can be added to the above-described solid lubricating coating film containing lubricating powder in the resin.

The thickness of the solid lubricating coating film is not particularly limited, but is generally in a range of 5 µm to 100 µm (0.0002 inches to 0.004 inches) and preferably in a range of 5 µm to 50 µm (0.0002 inches to 0.002 inches). When the solid lubricating coating film is formed, similarly, in order to improve the coating adhesion, it is preferable that the above-described undercoat treatment for increasing the surface roughness be performed on the contact surface to be coated.

Since the solid lubricating coating film is generally opaque, it is preferable that the solid lubricating film be applied to the contact surface of the box 2 in which the threaded portion is not easily damaged compared to the pin 1; and that the two-layer coating film according to the present invention including the ultraviolet ray-curable resin coating film as the lower layer and the acrylic silicone resin coating film as the upper layer be formed on the contact surface of the pin 1. By doing so, since the two-layer coating film has superior transparency, the two-layer coating film is typically formed on external surfaces of both ends of a long steel pipe and thus the state of the threaded portion of the pin portion which is easily damaged can be observed by visual inspection from the above of the two-layer coating film which covers the pin 1.

In the above-described embodiment, the threaded joint for a steel pipe including the shoulder portions 14 and 24 has been described as an example. However, the present invention can be applied to a threaded joint for a steel pipe not including the shoulder portions 14 and 24. For example, the threaded joint for a steel pipe is a threaded joint that a thread (for example, a wedge-shaped thread or the like) itself has a locking function which stops the rotation of connection.

The effects of the present invention will be described using the following examples. Hereinbelow, the contact surface including the threaded portion and the unthreaded metal contact portion of the pin will be referred to as "pin surface"; and the contact surface including the threaded portion and the unthreaded metal contact portion of the box will be referred to as "box surface". In the examples, "%" represents "% by mass" unless specified otherwise.

EXAMPLES

Example 1

In this example, various kinds of resin coating films were formed on the ultraviolet ray-curable resin coating film which covers the contact surface of the threaded joint for a steel pipe to investigate the rust prevention property. For reference, the same test was performed for a case where only the ultraviolet ray-curable resin coating film was formed and a case where a penetrating lubricant CRC 5-56 (KURE 5-56, manufactured by Kure Engineering Ltd.) which is known to have a high rust prevention effect was coated on the ultraviolet ray-curable resin coating film.

A thread cutting treatment was performed on a portion of a carbon steel pipe (outer diameter: 177.8 mm (7 inches)) approximately 120 mm (4.7 inches) distant from a pipe end. This threaded portion was spray-coated with a commercially available ultraviolet ray-curable resin coating material of epoxy acrylic resin (Aulrex 550, manufactured by Chugoku Marine Paints Ltd.) and was irradiated with ultraviolet rays at room temperature for 60 seconds to cure the coating film. Spray-coating and irradiation of ultraviolet rays were performed while rotating the steel pipe. A high-pressure mercury lamp was used as an ultraviolet light source, and the irradiation was approximately 500 mJ/cm$^2$. In this way, the ultraviolet ray-curable resin coating film having an average thickness of 30 μm (0.001 inches) was formed on the surface of the threaded portion.

The threaded portion on which the ultraviolet ray-curable resin coating film was formed was cut into plural strip specimens. Various kinds of commercially available resin coating materials or the above-described penetrating lubricant CRC 5-56 was spray-coated on the ultraviolet ray-curable resin coating films of the strip specimens. The three kinds of coating materials used are as follows.

(1) Thermosetting acrylic resin coating material: Acrylic lacquer spray a (manufactured by Dai Nippon Co., Ltd.)

(2) Fluororesin coating material: Spray coating material of polytetrafluoroethylene (manufactured by Henkel Japan Ltd.)

(3) Acrylic silicone resin coating material: Silicone lacquer spray (acrylic silicone resin coating material; manufactured by Kanpe Hapio Co., Ltd.)

After coating, the coating films were naturally dried according to the instruction of the coating material. Various kinds of resin coating materials or the penetrating lubricant CRC 5-56 was coated for about 5 seconds.

Using the strip specimens on which the ultraviolet ray-curable resin coating film as the lower layer and the resin coating film or the penetrating lubricant coating film as the upper layer were formed, a salt spray test (aqueous 5% NaCl solution, 40° C. (104° F.)) was performed for 200 hours according to JIS Z2371. The rust area ratios of the specimens 200 hours after the spray salt test were evaluated by visual inspection, and the results thereof are shown in Table 1 and FIG. 3.

TABLE 1

| Conditions | 1-1 | 1-2 | 1-3 | 1-4 | 1-5 |
|---|---|---|---|---|---|
| Lower-Layer Coating Film | Ultraviolet Ray-Curable Resin Coating Film | | | | |
| Upper-Layer Coating Film | None | CRC 5-56 | Acrylic Resin | Fluororesin | Acrylic Silicone Resin |
| Rust Area Ratio | 50% or higher | 40% to 50% | 30% to 40% | 40% to 50% | 0% to 10% |

Figure 3:
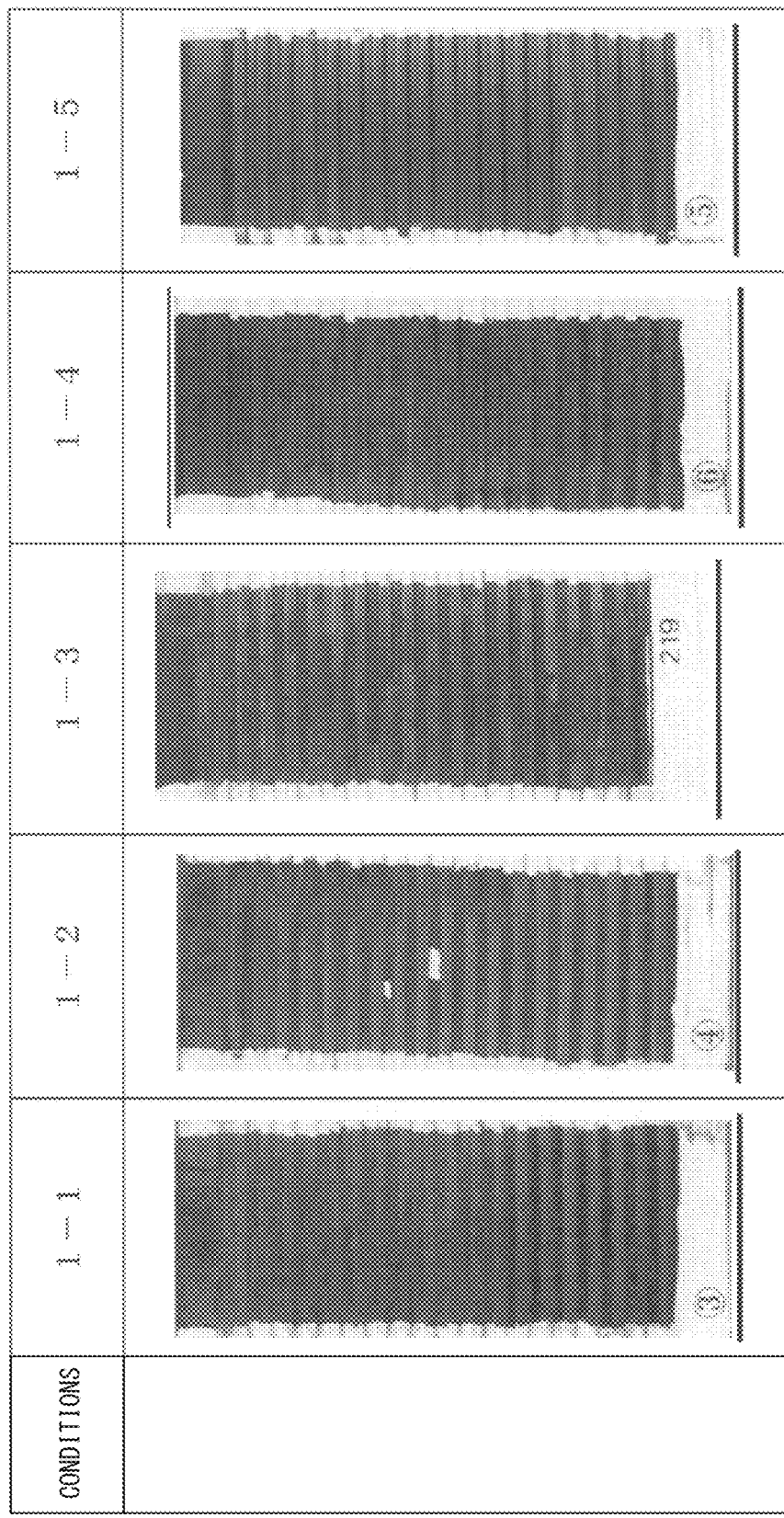
FIG. 3 shows images illustrating the results of a rust prevention test in Example 1.

As illustrated in Table 1 and FIG. 3, under the condition 1-1 that only the ultraviolet ray-curable resin coating film was formed and the resin coating film was not formed as the upper layer, rust was observed on 50% or higher of the entire surface of the threaded portion of the specimen. Meanwhile, under the condition 1-2 that the penetrating lubricant CRC 5-56 which is known to have a high rust prevention effect was coated for the upper layer, the rust area ratio was reduced to 40% to 50%. Under the condition 1-4 that the fluororesin was coated for the upper layer, the same effect was obtained. Under the condition 1-3 that the acrylic resin was coated for the upper layer, the rust area ratio was reduced to 30% to 40% but was insufficient. On the other hand, under the condition 1-5 that the acrylic silicone resin was coated for the upper layer, the rust area ratio could be reduced to approximately 10% or lower. It was clearly seen that the effect of the acrylic silicone resin was particularly higher as the upper-layer resin coating film for enhancing the rust prevention property of the ultraviolet ray-curable resin coating film.

Example 2

It was verified in Example 1 that the rust prevention effect of the coating film having the two-layer structure of the ultraviolet ray-curable resin coating film as the lower layer and the acrylic silicone resin coating film as the upper layer is significantly high. However, in the case of a threaded joint for a steel pipe, the connecting property of the threaded joint is the most important performance, and there is a concern that the formation of the acrylic silicone resin coating film may inhibit this performance. Therefore, the influence of the two-layer coating film on connecting performance and airtightness was inspected.

The pin surface of a threaded joint for a steel pipe (VAMTOP, registered trade name) having a seal portion, which was formed at a pipe end of an OCTG steel pipe having an outer diameter of 177.8 mm (7 inches), was spray-coated with the same ultraviolet ray-curable resin coating material of epoxy acrylic resin as that used in Example 1 and was irradiated with ultraviolet rays at room temperature for 60 seconds to cure the coating film. Spray-coating and irradiation of ultraviolet rays were performed while rotating the steel pipe. The ultraviolet light source, the irradiation dose, and the thickness of the coating film were the same as those of Example 1. In this way, the ultraviolet ray-curable resin coating film was formed on the entire pin surface containing a seal portion and a shoulder portion.

Regarding the pin surface which was coated with the ultraviolet ray-curable resin coating film, only the seal portion and the shoulder portion of the pin tip end or the entire pin surface containing the threaded portion was spray-coated with the same acrylic silicone resin coating material as that used in Example 1 and was naturally dried to form a coating film. Coating was performed while rotating the steel pipe. The thickness of the coating film was approximately 5 μm (0.0002 inches).

As shown in Table 2, the condition 2-1 was that the acrylic silicone resin was not coated (only the ultraviolet ray-curable resin coating film was coated); the condition 2-2 was that the acrylic silicone resin coating film was formed on only the pin tip end (the seal portion and the shoulder portion); and the condition 2-3 was that the acrylic silicone resin coating film was formed on the entire pin surface containing the threaded portion.

On the box surface, under any conditions, a solid lubricating solid film (thickness: 50 μm (0.002 inches)) containing high basic calcium sulfonate as a major component in a substrate having a wax component was formed.

The undercoat treatment performed before forming the ultraviolet ray-curable resin coating film was a zinc phosphating treatment on the pin surface and was a copper-tin-zinc ternary alloy plating treatment on the box treatment.

Using the threaded joint subjected to the surface treatment as described above, the connecting performance and the airtightness were inspected as follows.

Connecting Performance

The connecting performance was evaluated based on the influence on the shouldering torque and the torque on shoulder resistance. The shouldering torque refers to the torque value when the shoulder portions of the pin and the box are in contact with each other (when interference starts). In addition, the torque on shoulder resistance refers to the torque difference between the shouldering torque and the torque at the time of the yield deformation of the shoulder portion. As the torque on shoulder resistance is higher, the specified torque value during the connecting of the threaded joint can be set to be higher. Therefore, when connecting is performed at the specified torque value, the interference amount of the seal portion, that is, the airtightness of the threaded joint can be increased. When the threaded joint was finally connected at the specified torque value, the difference between the specified torque value and the shouldering torque value affects the contact pressure of the seal portions of the pin and the box. Therefore, the control of the shouldering torque value and the torque on shoulder resistance value is important.

Figure 4:
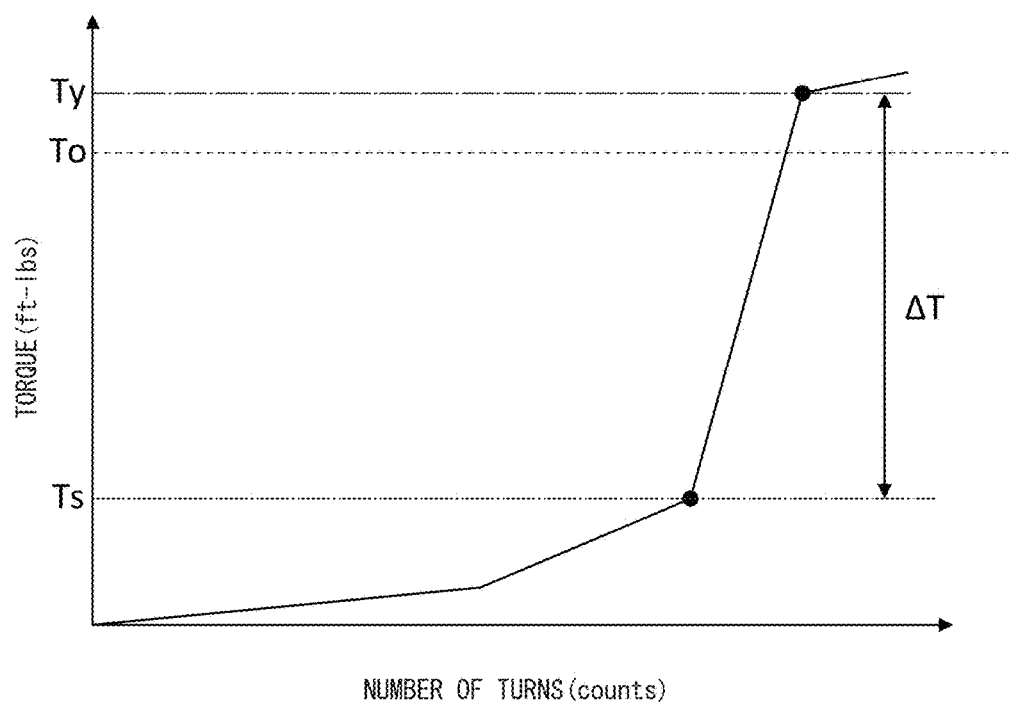
FIG. 4 is a torque chart illustrating the change of torque with respect to the number of turns of a threaded joint for a steel pipe.

Using the threaded joint in which the pin surface and the box surface were treated as described above, connecting started at a predetermined rotating speed. Connecting continued by applying the torque while monitoring the torque with respect to the number of turns until it was confirmed that the joint shoulder yielded. From the monitoring results (torque chart illustrating the torque change with respect to the number of turns; refer to FIG. 4), the torque at the point at which the rapid increase of toque increases was obtained as the shouldering torque Ts; and the difference between the torque (yield torque Ty) at the point at which the rapid increase of toque is stopped and the shouldering torque Ts was obtained as the torque on shoulder resistance ΔT. The test results under the respective conditions are collectively shown in Table 2.

TABLE 2

| Coating Conditions of Acrylic Silicone Resin Coating Film | | Shouldering Torque (ft-lbs) | Torque On Shoulder Resistance (ft-lbs) |
| --- | --- | --- | --- |
| Condition 2-1 | No Coating | 4851 | 7836 |
| Condition 2-2 | Coating on Only | 4432 | 7898 |

TABLE 2-continued

| Coating Conditions of Acrylic Silicone Resin Coating Film | | Shouldering Torque (ft-lbs) | Torque On Shoulder Resistance (ft-lbs) |
| --- | --- | --- | --- |
| Condition 2-3 | Pin Tip End (Seal Portion and Shoulder Portion) Coating On Entire Pin Surface | 4307 | 8725 |

As can be seen from the results of Table 2, as compared to the condition 2-1, the value of the shouldering torque Ts was reduced under the condition 2-2 and was further reduced under the condition 2-3. Under the condition 2-3 that the acrylic silicone resin coating film was coated on the entire pin surface, the value of the shouldering torque Ts was reduced by approximately 11% as compared to the condition 2-1. It was confirmed from these results that the formation of the acrylic silicone resin coating film on the ultraviolet ray-curable resin coating film does not inhibit the lubrication of the joint. Against the optimum torque To illustrated in FIG. 4, the lower limit of the shouldering torque Ts is substantially within a range of 5% to 15%, and the upper limit of the shouldering torque Ts is substantially within a range of 70% to 85%. Therefore, the variation of approximately 11% is a level which becomes no problems.

Meanwhile, the torque on shoulder resistance ΔT, which is the torque difference between the shoulder torque Ts and the torque (yield torque Ty) at the time of shoulder deformation, was increased by approximately 11% particularly under the condition 2-3 that the acrylic silicone resin coating film was formed on the entire pin surface, as compared to a case where the acrylic silicone resin coating film was not formed. The increase in the torque on shoulder resistance ΔT represents that the specified connecting torque is set to be higher correspondingly. Accordingly, the seal performance of the threaded joint for a steel pipe can be increased.

Airtightness

The threaded joint for a steel pipe in which the pin surface and the box surface were treated as described above was connected with the specified torque (7470 ft-lbs) and was heated at 180° C. (356° F.) according to a method of ISO13679 to perform an airtightness test under a complex load of internal pressure/external pressure and tension/compression. It was confirmed from the results for the airtightness that the existence of the acrylic silicone resin coating film does not affect the airtightness performance.

It was found from the above results that, when the acrylic silicone resin coating film is formed on the ultraviolet ray-curable resin coating film, the rust prevention property of the threaded joint for a steel pipe can be significantly improved; there are no adverse effects on the airtightness of the threaded joint for a steel pipe; and the specified torque can be set to be high because the torque on shoulder resistance ST is increased, thereby obtaining the effect of improving the sealing property of the threaded joint for a steel pipe.

EXPLANATION OF REFERENCES

A: oil country tubular goods
B: coupling
1: pin
2: box
11: male thread
21: female thread

13, 23: seal portion
14, 24: shoulder portion

The invention claimed is:

1. A threaded joint for a steel pipe, the threaded joint comprising:
 a pin and a box, each of the pin and the box is provided with a contact surface that includes an unthreaded metal contact portion having a seal portion, and a threaded portion;
 an ultraviolet ray-curable resin coating film positioned on the contact surface of at least one of the pin and the box;
 an acrylic silicone resin coating film disposed on and substantially coextensive with the ultraviolet ray-curable resin coating film; and
 wherein a thickness of the acrylic silicone resin coating film is 5 µm to 10 µm (0.0002 to 0.0004 inches).

2. The threaded joint according to claim 1, wherein the ultraviolet ray-curable resin coating film contains a colorant.

3. The threaded joint according to claim 1, wherein the ultraviolet ray-curable resin coating film is positioned on the contact surface of both the pin and the box, and the acrylic silicone resin coating film is disposed on and coextensive with the ultraviolet ray-curable resin coating film.

4. The threaded joint according to claim 3, wherein the ultraviolet ray-curable resin coating film contains a colorant.

* * * * *